(12) United States Patent
Cuillery

(10) Patent No.: US 8,544,679 B2
(45) Date of Patent: Oct. 1, 2013

(54) COOKING APPLIANCE LID

(75) Inventor: Pascal Cuillery, Faverges (FR)

(73) Assignee: SEB S.A., Ecully (FR)

( * ) Notice: Subject to any disclaimer, the term of this patent is extended or adjusted under 35 U.S.C. 154(b) by 650 days.

(21) Appl. No.: 11/886,630

(22) PCT Filed: Mar. 15, 2006

(86) PCT No.: PCT/FR2006/000577
§ 371 (c)(1),
(2), (4) Date: Sep. 18, 2007

(87) PCT Pub. No.: WO2006/097630
PCT Pub. Date: Sep. 21, 2006

(65) Prior Publication Data
US 2009/0020531 A1    Jan. 22, 2009

(30) Foreign Application Priority Data
Mar. 18, 2005  (FR) ...................... 05 02735

(51) Int. Cl.
*B65D 43/03* (2006.01)
*B65D 25/28* (2006.01)
(52) U.S. Cl.
USPC ......... 220/762; 220/772; 220/380; 220/212.5
(58) Field of Classification Search
USPC .... 16/110.1; 126/220; 215/305; 220/212.5, 220/380, 573.1, 752, 756, 757, 761, 762, 220/764, 765, 768, 772, 793, 805, 846
See application file for complete search history.

(56) References Cited

U.S. PATENT DOCUMENTS

| 25,466 | A | * | 9/1859 | Gould | 126/220 |
|---|---|---|---|---|---|
| 361,903 | A | * | 4/1887 | Sperry | 220/380 |
| 1,717,538 | A | | 6/1929 | Anderson | |
| 4,944,399 | A | * | 7/1990 | Ten Bruggencate et al. | 206/509 |
| 5,154,114 | A | | 10/1992 | Chang et al. | |
| 5,232,112 | A | * | 8/1993 | Howard | 220/212.5 |
| 5,251,774 | A | * | 10/1993 | Engle | 220/212 |
| 5,794,557 | A | * | 8/1998 | Geukens | 114/144 R |
| 6,230,925 | B1 | * | 5/2001 | Hardigg et al. | 220/761 |
| 6,665,911 | B1 | * | 12/2003 | Huang | 24/68 CD |
| 7,090,094 | B2 | * | 8/2006 | Wade et al. | 220/764 |

FOREIGN PATENT DOCUMENTS

| FR | 1 203 589 A | 1/1960 |
|---|---|---|
| GB | 2 142 868 A | 1/1985 |
| JP | 35-17181 | 7/1960 |
| JP | 41-8298 | 4/1966 |
| JP | S6091138 A | 5/1985 |
| RU | 2 221 473 C2 | 1/2004 |

OTHER PUBLICATIONS

English translation of Japanese Office Action, dated Aug. 23, 2011, from corresponding JP application.

* cited by examiner

*Primary Examiner* — Anthony Stashick
*Assistant Examiner* — Brett Edwards
(74) *Attorney, Agent, or Firm* — Young & Thompson

(57) ABSTRACT

A lid includes a grip member (3) capable of being at least in a stacked state wherein it does not prevent stacking of the lid with another similar lid, and a gripping state wherein it has a released surface for gripping the lid. The lid includes at least one elastic member (14) moving the grip member (3) from its stacked state to its gripping state.

19 Claims, 1 Drawing Sheet

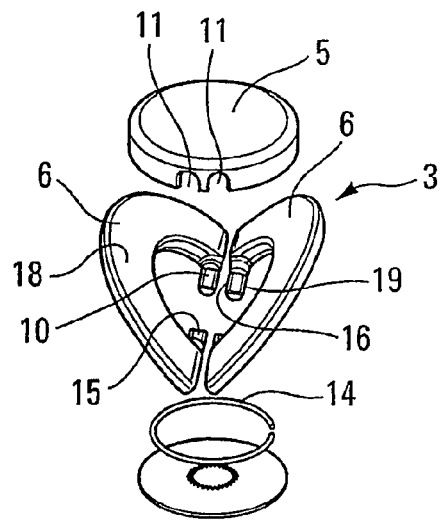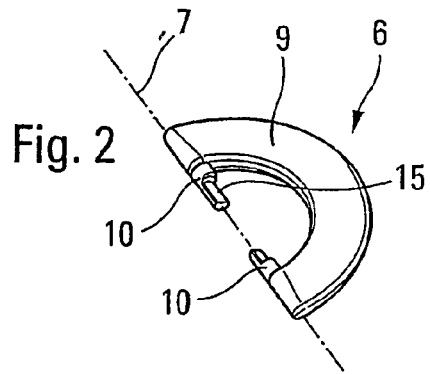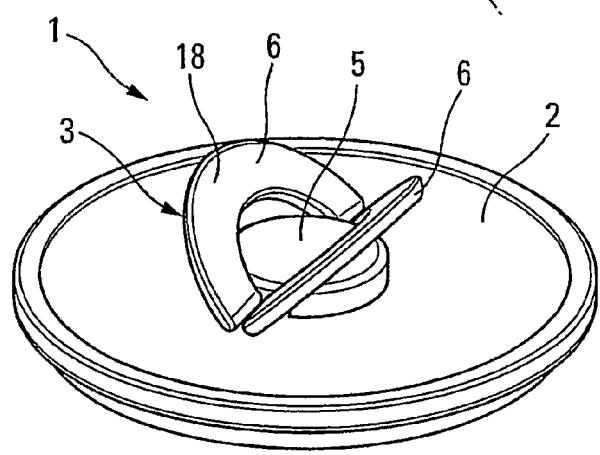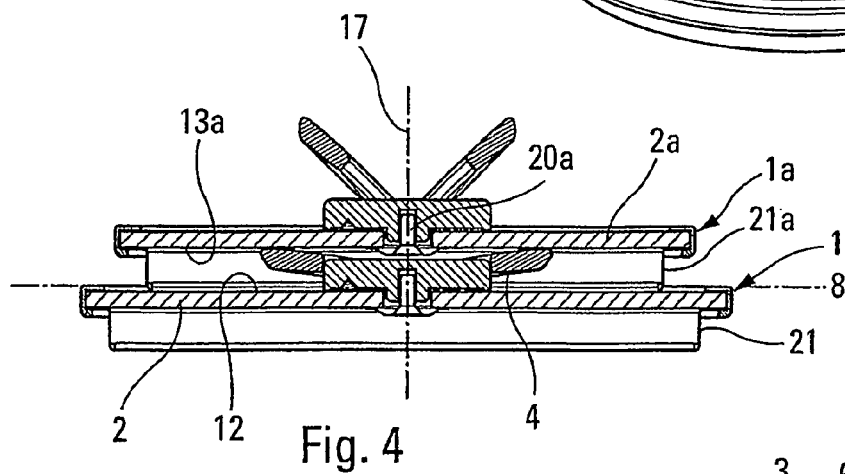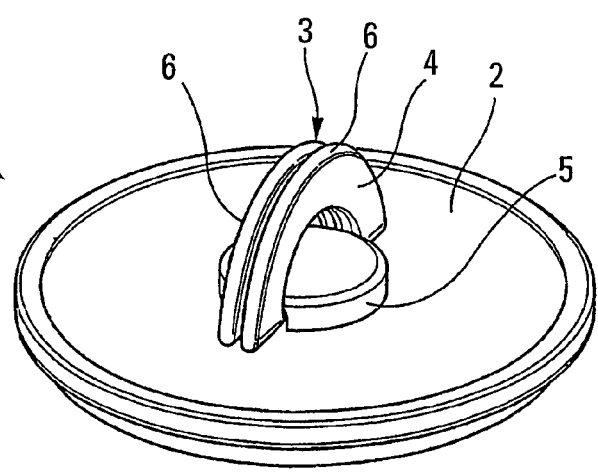

COOKING APPLIANCE LID

This present invention refers to a cooking appliance lid, such as a lid for a cooking pot, a deep fryer, a frying pan, etc.

Conventionally, a lid comprises a cover designed to close off the cooking appliance, and a grasping device projecting from the cover and allowing the lid to be held. However, because of its protrusion, the grasping device prevents the stable stacking of several similar lids.

In the context of remedying this problem, we already know of a lid of the type in which the grasping device can change from a stacked position in which it does not hinder the stacking of the lid, to a grasping position in which it presents a grasping surface that is clear of the lid.

There thus exists, in particular for camping articles, a lid whose grasping device is in the form of a handle, connected in a pivoting fashion to a base fixed to the centre of the lid. Since the handle pivots freely, then when the lid is resting flat, it is laid against the cover, and is therefore, firstly, raised to high temperature (like the cover) when the lid is covering a cooking appliance placed on a heat source, and, secondly, grasped only with difficulty by a user (increasingly as it gets hotter).

According to document U.S. Pat. No. 5,154,114, there also exists a lid with two handles fixed to the periphery of the lid by a hinge arrangement so that each handle has two stable positions, namely a stacking position and a carrying position which is more-or-less perpendicular to the stacking position. Because of the hinge arrangement, it is necessary to employ both hands to change a handle from one position to the other (and so always with the risk of burns when the cover is hot). Moreover, if the carrying position is relatively locked, it is again necessary to use both hands to return it to the stacking position, this being a lengthy and laborious process.

This present invention aims to create a lid that overcomes the aforementioned drawbacks.

According to the invention, a lid of the aforementioned type includes an elastic element for moving the grasping device from its stacked state to its grasping state.

Thus, by default, in particular when no lid is resting on the grasping device, the latter is in its grasping position, a state in which the grasping surface of the grasping device is clear of the cover. As a consequence, firstly the lid can be grasped easily, and, secondly, the grasping surface is not heated by the cover, by conduction.

Other advantages and particular features of this present invention will emerge from the following description of a embodiment that is given by way of a non-limiting example and illustrated by the appended drawings, in which FIG. 1 is a view in exploded perspective of a grasping device for a lid according to this present invention, FIG. 2 is a view in perspective of one flap of the grasping device, FIG. 3 is a view in perspective of a lid with the flaps of the grasping device in the grasping position, FIG. 4 is a view in section of a stack of two lids, with the flaps of the grasping device of the lower lid being in the stacking position, and those of the grasping device of the upper lid being in the grasping position, and FIG. 5 is a view in perspective of a lid with the flaps of the grasping device in the carrying position.

As can be seen in FIGS. 3 to 5, a lid 1 for a cooking appliance includes a cover 2 which is designed to close off the cooking appliance, and a grasping device 3 which is designed to allow the lid 1 to be grasped. The grasping device 3 is transformable, and includes at least two states, namely a stacked state in which it does not hinder the stacking of the lid with another lid 1a, as can be seen in FIG. 4, and a grasping state in which it presents a grasping surface 4 that is clear of the lid 1 (and more precisely, clear of the cover 2), as can be seen in FIGS. 3 and 4.

In this present embodiment, the grasping device 3 includes a base 5 which is fixed to the cover 2 (here, to the centre of the cover 2), and at least one flap 6 (here two flaps 6) which carries the grasping surface 4 of the grasping device 3, with each flap 6 being mobile in relation to the base 5, between at least a stacking position and a grasping position in which the grasping surface 4 is not in contact with the cover 2, with these positions corresponding to the stacking and grasping states of the grasping device 3 respectively.

Each flap 6 is mounted to rotate in relation to the base 5 on a rotation axis 7 which is parallel to the plane 8 tangential to the cover 2 at the level of the base 5, with the two rotation axes 7 of the flaps 6 being parallel to each other. In order to allow this articulation, each flap 6 includes a handle 9 of semi-circular shape, and two spindles 10 diametrically opposite to each other, extending radially toward the interior of the handle 9. In parallel, for each flap 6, the base 5 includes two openings 11 which face each other and which are each designed to receive a spindle 10 of the flap 6.

In this present embodiment, for lids 1 whose covers 2 have an outside diameter of between 140 and 280 mm, the base 5 has a cylindrical shape whose outside diameter is between 40 and 50 mm, preferably 45 mm, and with a thickness of between 5 and 10 mm, preferably 8 mm, each flap 6 (or more exactly each handle 9) has a half-crown shape with an inside diameter corresponding to the diameter of the base 5 and an outside diameter of between 70 and 90 mm, and preferably 80 mm, and whose thickness is between 4 and 8 mm.

As can be seen in FIG. 4 that when a flap 6 is in the stacking position, the grasping surface 4 is turned against the cover 2. Depending on the shape of the cover 2, when it is in the stacking position, the flap 6 can be oriented by a positive angle (oriented upwards) of less than 100, more often parallel to the tangential plane 8 or even oriented with a slight negative angle (oriented downwards), that is in a plane between the tangential plane 8 and the plane of the cover 2.

The small thickness of the grasping device 3 in its stacked position means that it does not interfere with the cover 2a of the lid 1a resting on the lid 1 on which it is mounted. The thickness of the grasping device 3 in the stacked state is less than the distance, at the level of the grasping device 3, separating the upper surface 12 of the cover 2 of the lid 1 carrying this device 3 from the fixing screw 20a of the grasping device 3 of the lid 1a.

In this present embodiment, the thicknesses of the base 5 and of each flap 6 are less than the distances, at the level of these different elements 5, 6, separating the upper surface 12 of the cover 2 of the lid 1 carrying these elements 5, 6 from the lower surface 13a of the cover 2a of the lid 1a resting on the first lid 1, considering the orientation of the flaps 6.

The difference of level between the lower 2 and upper 2a covers is determined mainly by the height of a circular peripheral rim 21, 21a bordering each of the flat or slightly concave covers 2, 2a.

According to this present invention, the lid 1 includes an elastic element 14 which moves the grasping device 3 from its stacked state to its grasping state. As a consequence, when a lid 1 is placed upon a cooking appliance resting on a heat source, then because of the presence of the elastic element 14, the grasping device 3 is in its grasping state, and its grasping surface 4, clear of the cover 2, is not heated and can be grasped easily by a user.

The elasticity of the elastic element 14 is such that the weight of an objet, such as a lid for a cooking appliance placed onto the grasping device 3, moves the latter from its grasping state to its stacked state.

As can be seen in FIGS. 3 and 4, when a flap 6 is in its grasping position, it is inclined in relation to the tangential plane 8 so as to render the grasping surface 4 accessible. In order to allow easy grasping, it is preferable that each flap 6, in the grasping position, should be oriented in a plane that makes at least 30° with the tangential plane 8 (here, the orientation is more-or-less equal to 45°).

In this present embodiment, the elastic element 14 takes the form of a spring 14 which is mounted in the grasping device 3 (here, in the base 5). Each spindle 10 of each flap 6 includes a contact surface 15 on which the spring 14 rests, with the contact surface 15 making an angle with the surface formed by the handle 9, which is equal to the angle of the flap 6 in the grasping position with the tangential plane 8, the spring 14 being positioned in the tangential plane 8. Thus, when the flaps 6 are in their stacking position, the spring 14 bears onto first axial edges 16 of the spindles 10 and moves each spindle 10 until it is making contact with all of the contact surface 15.

In addition, in this present embodiment, each flap 6 in the grasping position is oriented in a plane making an angle of at most 60° with the tangential plane 8, and is mobile beyond this grasping position, until reaching a carrying position in which it lies in a plane that is more-or-less parallel to the plane 17 normal to the tangential plane 8.

In this present embodiment, when they are in carrying position, the two flaps 6 are pressed against each other by means of their contact surfaces 18 which are on the other side from their grasping surfaces 4.

When they are in their carrying position, the flaps 6 are moved by the elastic element 14 toward their grasping position, the spring 14 bears onto second axial edges 19 of the spindles 10 and moves each spindle 10 until it is making contact with all of the contact surface 15.

In order to improve the grip on the lid 1, the grasping device 3 is shaped so that the two flaps 6, in the carrying position, behave as a fixed (or almost fixed) part in relation to the cover 2, and the two flaps 6 cannot slide in relation to each other.

To this end, in this present embodiment, the distance between the two rotation axes 7 corresponds more-or-less to the thickness of each flap 6, so that when the two flaps 6 are

The invention claimed is:

1. An assembly comprising a first lid and a second lid for a cooking appliance, each lid including:
   a cover having an upper surface and a lower surface,
   a peripheral rim bordering the lower surface of the cover and having a height,
   a grasping device that can be in at least i) a stacked position in which the grasping device does not hinder the stacking of the first lid with a second lid, and ii) a grasping position in which the grasping device presents a grasping surface clear of the lid, and
   an elastic element for moving the grasping device from the stacked position to the grasping position,
   each grasping device including:
   a base fixed to the upper surface of the cover, the elastic element being positioned inside the base and above the cover, and
   at least one flap which carries the grasping surface and which is mobile in relation to the base between the stacking position and the grasping position in which the grasping surface is not in contact with the cover, the at least one flap being mounted on the base to rotate in relation to the base on a rotation axis parallel to a plane tangential to the cover at a level of the base,
   said elastic element having an elasticity which causes movement of the flap from the grasping position to the stacked position when the rim of the second lid is applied onto the upper surface of the first lid, and the lower surface of said second lid is applied against the flap of the cover of the first lid which is then set inside said peripheral rim of the second lid, wherein,
   elastic element is a flat, open ring spring,
   each flap includes two spindles diametrically opposite to each other and extending radially toward an interior of the handle, and
   said two spindles of each flap contact the spring.

2. The assembly according to claim 1, wherein the at least one flap is mobile up to a carrying position in which the at least one flap is substantially normal to the tangential plane.

3. The assembly according to claim 1, wherein the grasping device includes two flaps, with the two rotation axes of the flaps being parallel to each other, the two flaps being pressed against each other by means of their contact surfaces, on the other side from their grasping surface.

4. The assembly according to claim 3, wherein the distance between the two rotation axes is such that, when the two flaps are pressed against each other, they can pivot in relation to the base only by at most 10° on each side of the plane normal to the tangential plane.

5. The assembly according to claim 3, wherein each flap includes a handle of a semi-circular shape.

6. The assembly according to claim 5, wherein the base includes at least two openings which face each other and which each receive one of the spindles of the flap.

7. The assembly according to claim 5, wherein each spindle includes a contact surface on which the spring rests, the contact surface making an angle with a surface formed by the handle, which is equal to the angle of the flap in the grasping position with the tangential plane.

8. The assembly according to claim 7, wherein each spindle comprises first axial edges onto which the spring bears when the flap is in its stacking position.

9. The assembly according to claim 7, wherein each spindle comprises second axial edges onto which the spring bears when the flap is in the carrying position in which the flap is substantially normal to the tangential plane.

10. The assembly according to claim 1, wherein the thickness of the grasping device in the stacked position is less than a distance, at a level of the grasping device, separating an upper surface of the cover from a fixing screw of a fixing device of the second lid resting on the first lid.

11. The assembly comprising a first lid and a second lid for a cooking appliance, each lid including:
    a cover having an upper surface and a lower surface,
    a peripheral rim bordering the lower surface of the cover and having a height, and
    a grasping device that can be in at least i) a stacked position in which the grasping device does not hinder the stacking of the first lid with the second lid, and ii) a grasping position in which the grasping device presents a grasping surface clear of the lid,
    an elastic element for moving the grasping device from the stacked position to the grasping position,
    each grasping device including:
    a base fixed to the upper surface of the cover, and
    a pair of flaps, each flap having a lower surface defining the grasping surface and which is mobile in relation to the base between the stacking position and the grasping position in which the grasping surface is not in contact with the cover, each flap being mounted on the base to rotate in relation to the base on a rotation axis parallel to a plane tangential to the cover at a level of the base, each flap including a handle of a semi-circular shape, and two spindles diametrically opposite to each other and extending radially toward an interior of the handle, the elastic element being a flat, open ring spring positioned inside the base and resting on each spindle, said two spindles of each flap contacting the spring, the elastic element having an elasticity which causes movement of the flap from the grasping position to the stacked position when the rim of the second lid is applied onto the upper surface of the first lid, and the lower surface of said second lid is applied against the flap of the cover of the first lid which is then set inside said peripheral rim of the second lid.

12. The assembly according to claim 11, wherein each spindle includes a contact surface on which the spring rests, the contact surface making an angle with a surface formed by the handle, which is equal to the angle of the flap in the grasping position with the tangential plane.

13. The assembly according to claim 12, wherein each spindle comprises first axial edges onto which the spring bears when the flap is in the stacking position.

14. A assembly comprising a first lid and a second lid for a cooking appliance, each lid including:
   a cover having an upper surface and a lower surface,
   a peripheral rim bordering the lower surface of the cover and having a height, and
   a grasping device comprising a base fixed to the cover and at least one flap which carries a grasping surface of the grasping device and which is mobile in relation to the base, the at least one flap being mounted on the base to rotate in relation to the base on a rotation axis parallel to a plane tangential to the cover at a level of the base, the flap being movable between at least three positions including:
      i) a stacked position in which the flap does not hinder the stacking of the first lid with the second lid,
      ii) a grasping position in which the flap presents the grasping surface clear of the lid, and
      iii) a carrying position in which the flap is substantially normal to a plane tangential to the cover,
   an elastic element for moving the flap from the stacked position to the grasping position and from the carrying position to the grasping position, the elastic element having an elasticity which causes movement of the flap from the grasping position to the stacked position when the rim of the second lid is applied onto the upper surface of the first lid, and the lower surface of said second lid is applied against the flap of the cover of the first lid which is then set inside said peripheral rim of the second lid,
   each flap including a handle of a semi-circular shape, and two spindles diametrically opposite to each other and extending radially toward an interior of the handle,
   the elastic element being a flat, open ring spring, and
   said two spindles of each flap contacting the spring.

15. The assembly according to claim 14, wherein each spindle includes a contact surface, and the contact surface of each spindle makes an angle with a surface formed by the handle, which is equal to the angle of the flap in the grasping position with the tangential plane.

16. The assembly according to claim 14, wherein the grasping device includes two flaps, with the two rotation axes of the flaps being parallel to each other.

17. The assembly according to claim 16, wherein the distance between the two rotation axes is such that, when the two flaps are pressed against each other, they can pivot in relation to the base only by at most 10° on each side of the plane normal to the tangential plane.

18. The assembly according to claim 14, wherein each spindle includes a contact surface on which the spring rests when the flap is in the grasping position, first axial edges onto which the spring bears when the flap is in the stacking position and second axial edges onto which the spring bears when the flap is in the carrying position.

19. The assembly according to claim 1, 11 or 15, wherein the elasticity of the elastic element causes movement of the flap from the stacked position to the grasping position when the second lid is removed from the first lid.

* * * * *

UNITED STATES PATENT AND TRADEMARK OFFICE
CERTIFICATE OF CORRECTION

PATENT NO.        : 8,544,679 B2                                                    Page 1 of 1
APPLICATION NO.   : 11/886630
DATED             : October 1, 2013
INVENTOR(S)       : Pascal Cuillery It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 738 days.

Signed and Sealed this

Fifteenth Day of September, 2015

Michelle K. Lee
*Director of the United States Patent and Trademark Office*